(12) United States Patent
Drepper (10) Patent No.: US 8,042,099 B2
(45) Date of Patent: Oct. 18, 2011

(54) FACILITATING AVAILABILITY OF OBJECT DATA TYPES AT RUNTIME

(75) Inventor: Ulrich Drepper, Los Gatos, CA (US)

(73) Assignee: Red Hat, Inc., Raleigh, NC (US)

( * ) Notice: Subject to any disclaimer, the term of this patent is extended or adjusted under 35 U.S.C. 154(b) by 1173 days.

(21) Appl. No.: 11/809,042

(22) Filed: May 30, 2007

(65) Prior Publication Data

US 2008/0301644 A1 Dec. 4, 2008

(51) Int. Cl.
*G06F 9/44* (2006.01)
(52) U.S. Cl. .............................. 717/124
(58) Field of Classification Search .............. 717/124, 717/126, 131
See application file for complete search history.

(56) References Cited

U.S. PATENT DOCUMENTS

| | | | |
|---|---|---|---|
| 5,655,073 A * | 8/1997 | Nishikado et al. | 717/124 |
| 5,659,753 A * | 8/1997 | Murphy et al. | 717/147 |
| 6,178,548 B1 * | 1/2001 | Hickman et al. | 717/124 |
| 6,226,786 B1 * | 5/2001 | Hickman et al. | 717/124 |
| 6,938,239 B2 * | 8/2005 | McDermott et al. | 717/100 |
| 2005/0235277 A1 * | 10/2005 | McDermott et al. | 717/143 |
| 2006/0101398 A1 * | 5/2006 | Schepers et al. | 717/120 |
| 2008/0288923 A1 * | 11/2008 | Shimogori | 717/125 |

* cited by examiner

*Primary Examiner* — Anna Deng
(74) *Attorney, Agent, or Firm* — Lowenstein Sandler PC (57) ABSTRACT

A method and apparatus for facilitating availability of object data types at runtime are described. In one embodiment, the method may include parsing debug information generated by a compiler for a software program, identifying in the debug information desired data types and objects associated with the desired data types, and creating for each desired data type an object list including references to associated objects. The method may further include adding resulting object lists to a set of object files generated by the compiler for the software program. The set of object files with the added object lists may then be used by a linker when creating an executable file for the software program.

18 Claims, 5 Drawing Sheets

FACILITATING AVAILABILITY OF OBJECT DATA TYPES AT RUNTIME

TECHNICAL FIELD

Embodiments of the present invention relate to computer programs, and more specifically to facilitating availability of object data types at program runtime.

BACKGROUND

When creating source code of a program, a programmer typically declares variables using names and data types, and specifies functions that perform operations on the variables. In addition, the programmer may need to provide memory allocation for the variables. Because it is a manual process, a reference specified by the programmer may not be valid (e.g., may refer to a non-existent memory location, a variable being referenced may not be initialized, the memory location might have been freed, etc.). In some programming languages, it is possible to mismatch the types of the reference and the referenced object.

During runtime, when a function passes a reference to an object, the program may terminate abnormally if the reference was specified by the programmer incorrectly. In addition, the program may terminate abnormally if the object being referenced has a data type that is inconsistent with an operation that needs to be performed on the object by the function.

In some programming languages (e.g., C), debugging a problem caused by an invalid reference is not a trivial task because data type information is not available at runtime for certain variables. In particular, the data type information is only available in a few situations such as if local variables are initialized by explicit function calls. As to global and initialized automatic variables, they are initialized by the compiler and their data type information is not expressly stated in the object file created by the compiler.

The most common solution for the above problem uses heuristics to determine whether a reference passed by a function is for an object initialized by the compiler. If so, an error message is returned indicating that the reference is invalid. However, this solution leads to false positives because it does not account for references to objects initialized by the compiler that have a proper data type. Furthermore, the above solution cannot track references to objects that do not have a proper data type even though they were not initialized by the compiler.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and apparatus for facilitating availability of object type information at runtime. In particular, when creating object files for a program, a compiler can also generate debug information that contains detailed information about the relationship between the source code and the generated object code. In one embodiment, the debug information generated by the compiler is parsed to identify one or more desired data types and objects associated with the desired data types. For each desired data type, an object list including references to associated objects is then created, and the resulting object lists are added to a set of object files generated by the compiler for the software program. The set of object files with the added object lists are used by a linker when creating an executable file for the software program.

In one embodiment, at runtime, when a function is passed a reference to an object, a determination is made as to whether the referenced object satisfies a required data type. The determination is made using an object list associated with the required data type. If the referenced object is identified in this object list, the function is allowed to use the referenced object. Otherwise, if the referenced object is not identified in this object list, an error is signaled indicating that the reference is invalid.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "creating" or "identifying" or "calculating" or "determining" or "displaying" or the like, refer to the action and processes of a computer system, or similar electronic computing device, that manipulates and transforms data represented as physical (electronic)

quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
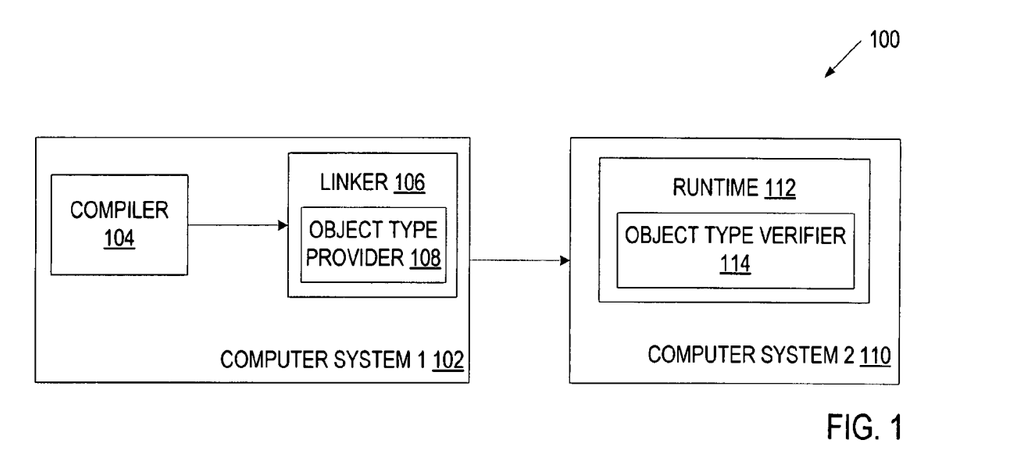
FIG. 1 is a block diagram of an exemplary system architecture in which embodiments of the invention may be implemented.

FIG. 1 illustrates an exemplary system architecture 100 in which embodiments of the present invention may operate. The system architecture 100 may include computer systems 102 and 110, each of which may be, for example, a personal computer (PC), a mobile phone, a palm-sized computing device, a personal digital assistant (PDA), etc.

The computer system 102 hosts a compiler 104 and a linker 106. The compiler 104 creates object files for a program. In some programming languages (e.g., C), the compiler 104 does not expressly provide in the object files information on data types of objects defined in the program.

The compiler 104 may have an option for generating debug information during the compilation. The debug information contains detailed information about the relationship between the source code and the object code. The debug information may be provided in a standardized debugging format such as DWARF ("Debug With Attributed Data Format"). The object files may be provided in such formats as ELF ("Executable and Linking Format"), COFF ("Common Object File Format"), etc.

The linker 106 assembles the object files into a single executable file in such formats as ELF, COFF, etc. In one embodiment, the linker 106 includes an object type provider 108 that extracts data types of objects from the debug information generated by the compiler 104 and adds object lists including references to objects associated with distinct data types to the object files, as will be discussed in more detail below. Alternatively, the object type provider 108 is not part of the linker 106 but rather an independent component that creates the data type information and adds it to the object files prior to linking.

The executable file created by the linker 106 is provided to the computer system 110. In one embodiment, in which the computer systems 102 and 110 are coupled via a network (e.g., a public network such as Internet or a private network such as a local area network (LAN)), the executable file may be provided to the computer system 110 via the network. Alternatively, the executable file can be transferred to the computer system 110 manually (e.g., via a floppy disc or CD-ROM). In yet another embodiment (not shown), the computer systems 102 and 110 are combined into a single computer system.

The computer system 110 hosts a runtime module 112 that accesses the executable file to execute the program. The runtime module 112 may operate in a debug mode or a non-debug mode. In one embodiment, the runtime module 112 includes an object type verifier 114 that verifies data types of objects referenced by functions during program execution. The object type verifier 114 determines data types of referenced objects using data type information created by the object type provider 108, as will be discussed in more detail below. If a referenced object has a data type consistent with the function, the function is allowed to use the referenced object. Alternatively, an error is generated indicating that the reference to the object is invalid.

In one embodiment, the object type verifier 114 is part of a thread library used to run and/or debug threaded code. The thread library may use different objects to perform required operations. These objects may include, for example, objects representing threads, objects representing mutexes ("mutual exclusions"), objects representing attributes, etc.

In one embodiment, the runtime module 112 can operate with the object type verifier 114 enabled to utilize the data type information, or with the object type verifier 114 disabled to ignore the data type information. The object type verifier 114 may be enabled only when the program is executed in debug mode or when the program is executed in both debug and non-debug modes.

Accordingly, with the system 100, invalid references to objects can be easily detected at runtime, without requiring any changes to the source code or the compiler. Furthermore, the same executable file can be used when executing the program either with the object type verifier 114 enabled or disabled (i.e., no significant negative effect on runtime).

Figure 2:
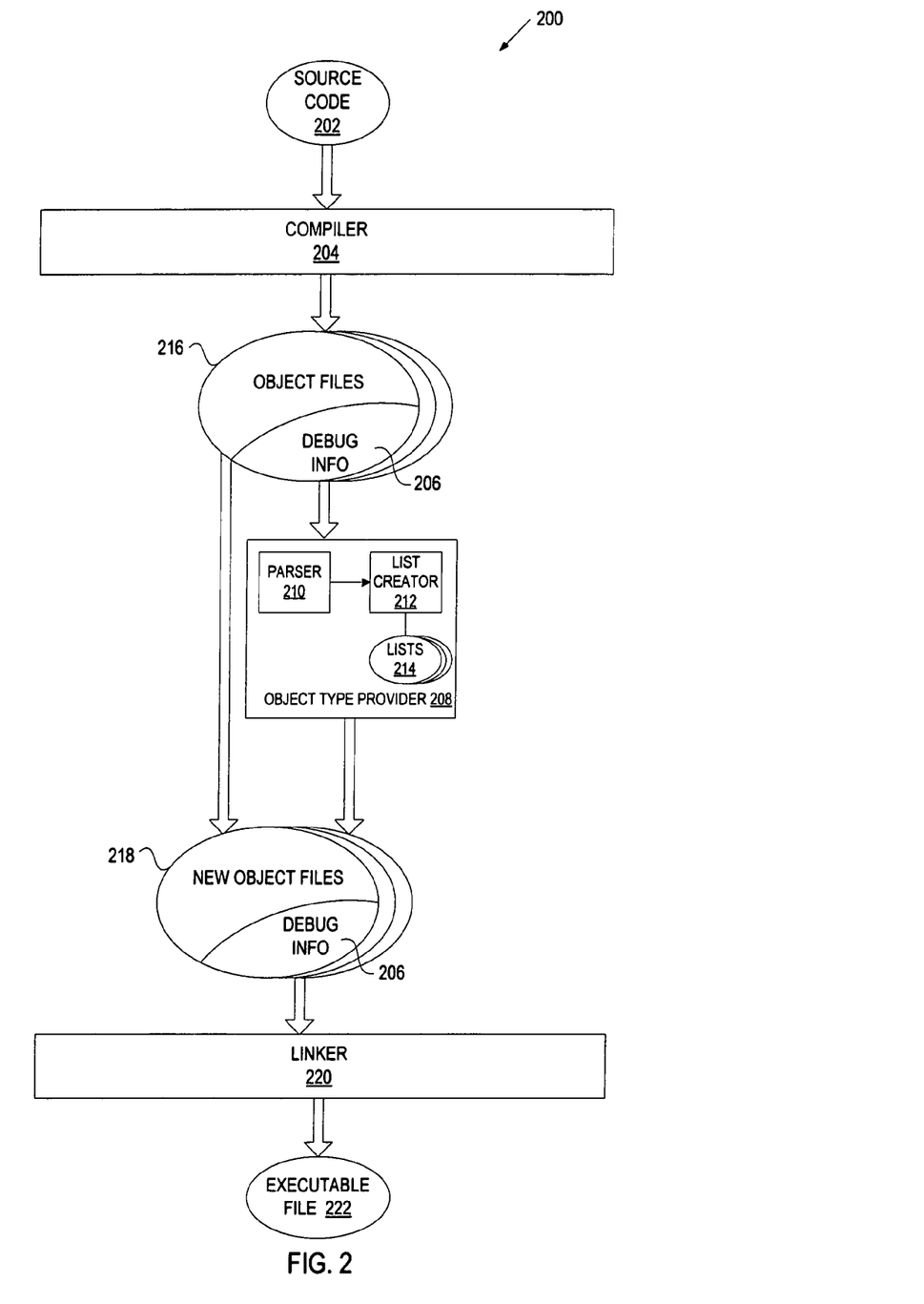
FIG. 2 is a block diagram illustrating the creation of an executable file of a program according to one embodiment of the invention.

FIG. 2 is a block diagram illustrating the creation of an executable file of a program according to one embodiment of the invention. Referring to FIG. 2, a compiler 204 receives source code 202 of a program and generates object files 216 for the program. The compiler 204 also produces debug information 206 as part of an object file 216. As discussed above, the debug information 206 may be in the DWARF format and the object files 216 may be in the ELF or COFF format. The debug information 206 includes voluminous data describing the relationship between the source code and the object code. This voluminous data includes information on data types of objects used by the program.

An object type provider 208 utilizes the debug information 206 to create object lists including references to objects associated with distinct data types. In one embodiment, the object type provider 208 includes a parser 210 and a list creator 212. The parser 210 parses the debug information 206 to identify desired data types and objects associated with the desired data types. The list creator 212 creates, for each desired data type, an object list 214 including references to associated objects. Each object list 214 may be stored in a separate table or some other data structure (e.g., a graph, a tree, etc.). Alternatively, all the object lists 214 are stored in a single data structure (e.g., a single table or graph).

Further, the object type provider 208 adds the resulting object lists 214 to the object files 216, producing new object files 218. In particular, the object type provider 208 handles each object file 216 individually, adding the resulting object list 214 to the object file 216 being processed, and producing a corresponding new object file 218. A linker 220 assembles the new object files 218 into a single executable file 222.

Figure 3:
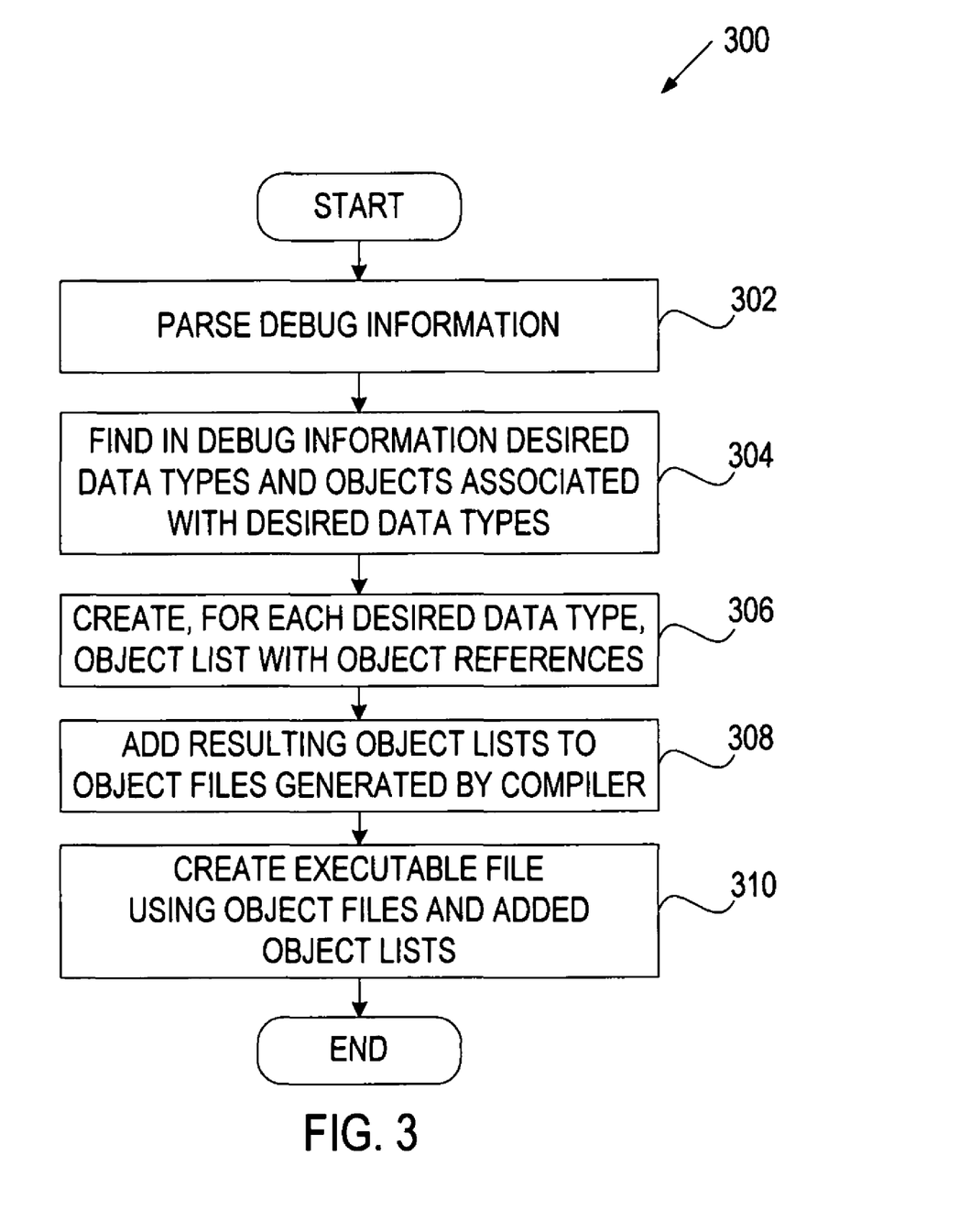
FIG. 3 is a flow diagram of one embodiment of a method for facilitating availability of object type information at runtime.

FIG. 3 is a flow diagram of one embodiment of a method 300 for facilitating availability of object type information at runtime. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a computer system 102 of FIG. 1.

Referring to FIG. 3, method 300 begins with processing logic parsing debug information generated by a compiler for a program (block 302). In one embodiment, the debug information includes a first table that includes references to all data types used in the program, and a second table that includes all objects defined in the program and references to their data types. In this embodiment, processing logic parses the debug information to locate the first and second tables.

At block 304, processing logic finds in the debug information desired data types and objects associated with the desired data types. The desired data types may include, for example, integers, characters, abstract data types, tuples, records, classes, etc. In one embodiment, processing logic finds desired data types in the first table within the debug information, and then searches for references to the desired data types from the first table in the second table. The entries found this way are for the objects associated with the desired data types. The objects to be found may include, for example, global and/or initialized automatic variables of any of the desired data types, global and/or initialized automatic variables of a data structure type that have at least one element of any of the desired data types, global and/or initialized automatic variables of a union type that have at least one element of any of the desired data types, etc.

At block 306, processing logic creates for each desired data type an object list including references to the associated objects. Each object list may be stored in a separate table or some other data structure, or all the object lists may be stored in a single data structure. The lists may be in the same format as the object files (e.g., ELF or COFF), using the same names for data types and object references as those used in the object files.

At block 308, processing logic adds resulting object lists to the object files generated by the compiler. At block 310, processing logic creates an executable file using the object files with the added object lists.

Figure 4:
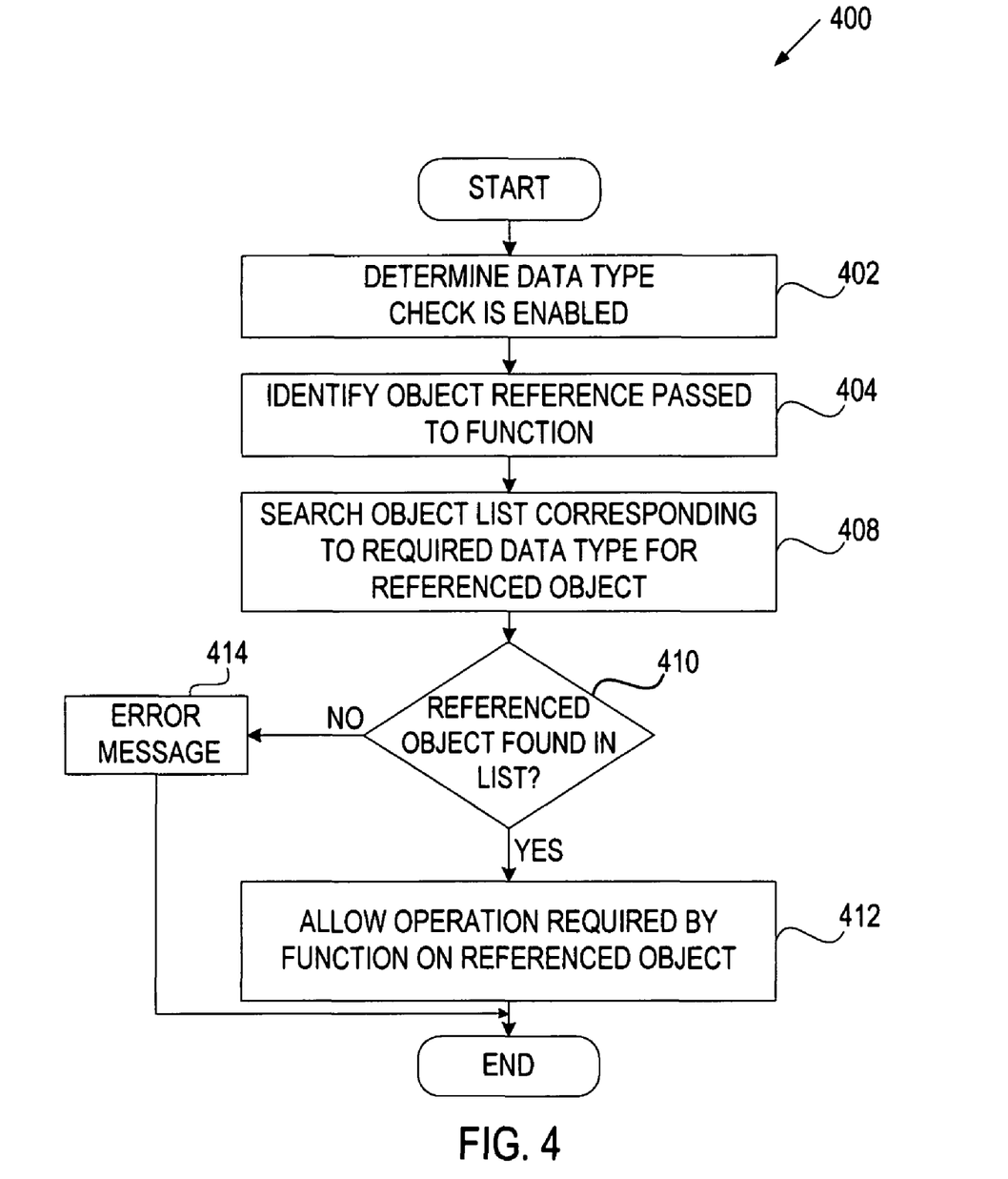
FIG. 4 is a flow diagram of one embodiment of a method for utilizing object type information at runtime.

FIG. 4 is a flow diagram of one embodiment of a method 400 for utilizing object type information at runtime. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a computer system 110 of FIG. 1.

Referring to FIG. 4, method 400 begins with processing logic determining that a program should be executed with a data type check enabled (block 302). The program can be executed in a debug or non-debug mode. In one embodiment, when the data type check is enabled, all references to objects passed to functions that require a specific data type need to be checked.

At block 404, processing logic identifies an object reference passed to a function during the execution of the program. At block 408, processing logic locates an object list associated with the required data type, and searches this list for an object reference matching the reference passed to the function.

If the matching object reference is found in the object list (block 410), processing logic allows the function to use the referenced object (block 412). If the matching object reference is not found in the object list, processing logic generates an error indicating that the reference passed to the function is invalid.

In one embodiment, the above techniques for making object type information available at runtime are extended to provide a special treatment for automatic variables. The special treatment may be needed because automatic variables do not always exist. They get created when the function (or basic block) containing the automatic variables is entered and they get destroyed when the function/basic block is left. In addition, there can be multiple instances of an automatic variable because the function can be called recursively, and/or more than one thread can call the same function at the same time. Hence, the runtime techniques discussed above would have to look through all the stack frames of all the threads to determine whether any of the stack frames contains the automatic variable.

The above runtime task can be simplified by extending the functionality of a compiler. In particular, the compiler can locate automatic variables of different types and create a list of currently active, initialized automatic variables for each type. Then, at runtime, when a reference to an object is passed to a function, the data type check will include searching two lists—an object list associated with a desired data type and a compiler-generated list associated with the desired data type. An error will then be generated only if the referenced object cannot be found on either of the two lists.

Figure 5:
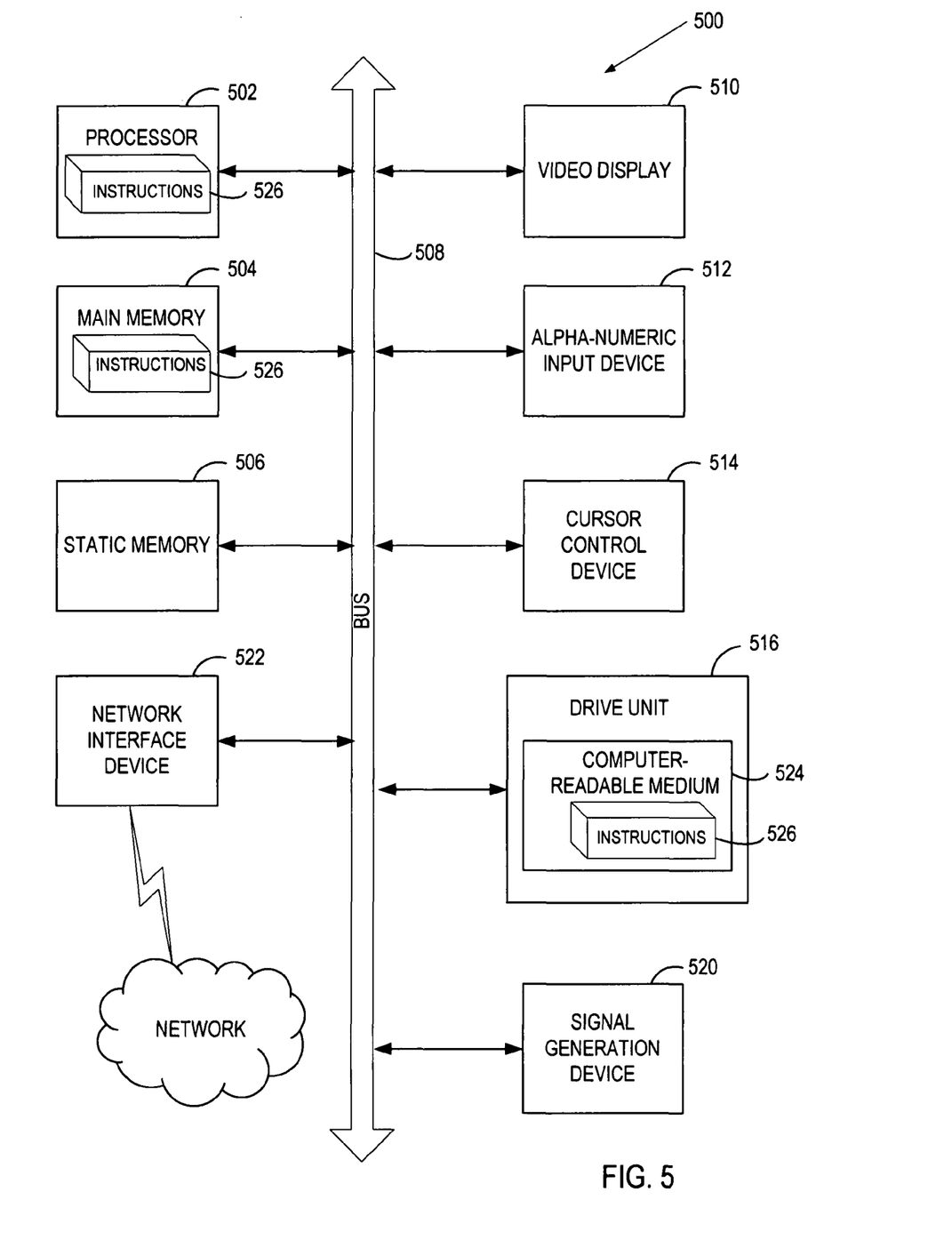
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), and a static memory 506 (e.g., flash memory, static random access memory (SRAM), etc.), which may communicate with each other via a bus 530. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute processing logic 526 for performing the operations and steps discussed herein.

The computer system 500 may further include a network interface device 522. It also may include a video display unit 510 (e.g., a liquid crystal display (LCD) or a cathode ray tube (CRT)), an alphanumeric input device 512 (e.g., a keyboard), a cursor control device 514 (e.g., a mouse), and/or a signal generation device 520 (e.g., a speaker).

The computer system 500 may also include a data storage device 516 having a machine-accessible storage medium 524 on which is stored one or more sets of instructions (e.g., software 526) embodying any one or more of the methodologies or functions described herein. The software 526 may also reside, completely or at least partially, within the main memory 504 and/or within the processing device 502 during execution thereof by the computer system 500, the main memory 504 and the processing device 502 also constituting machine-accessible storage media. The software 526 may further be transmitted or received over a network 520 via the network interface device 522.

While the machine-accessible storage medium 524 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    parsing debug information generated by a compiler for a software program;
    identifying, in the debug information, one or more desired data types and objects associated with the desired data types;
    creating, for each desired data type, an object list including references to associated objects; and
    adding resulting object lists to a set of object files generated by the compiler for the software program, the set of object files with the added object lists to be used by a linker when creating an executable file for the software program,
    wherein the added object lists are utilized at runtime to determine whether a reference to an object passed to a function satisfies a data type requirement.

2. The method of claim 1 wherein the objects identified in the debug information comprise global and initialized automatic variables of any of the desired data types.

3. The method of claim 1 wherein the objects identified in the debug information comprise each global or initialized automatic variable of a data structure type that has at least one element of any of the desired data types.

4. The method of claim 1 wherein the objects identified in the debug information comprise each global or initialized automatic variable of a union type that has at least one element of any of the desired data types.

5. The method of claim 1 wherein creating, for each desired data type, an object list further comprises:
    creating a table for each desired data type; and
    storing references to associated objects in the table.

6. The method of claim 1 wherein utilizing the added object lists comprises:
    determining that a data type check is enabled;
    searching at least one added object list corresponding to the data type requirement for an object reference matching the reference passed to the function;
    determining that the reference to the object satisfies the data type requirement if the matching object reference is found in the at least one added object list; and
    returning an error if the matching object reference is not found in the at least one added object list.

7. The method of claim 1 wherein:
    the debug information has a DWARF format; and
    the set of object files and the executable file have an ELF or ECOFF format.

8. A computer-implemented method comprising:
    identifying a reference to an object passed to a program function during an execution of a program;
    determining whether the referenced object satisfies a required data type using an object list including references to objects associated with the required data type, the object list being created based on debug information generated for the program by a compiler;
    allowing the program function to use the referenced object if the referenced object satisfies the required data type;
    generating an error if the referenced object does not satisfy the required data type;
    creating one or more object lists based on the debug information, each object list being associated with one of predetermined data types;
    adding the object lists to a set of object files generated by the compiler for the program; and
    creating an executable file for the program using the set of object files with the added object lists.

9. The method of claim 8 wherein the objects in the lists comprise global and initialized automatic variables of predetermined data types.

10. The method of claim 8 wherein the objects in the lists comprise each global or initialized automatic variable of a data structure type that has at least one element of any of the predetermined data types.

11. The method of claim 8 wherein the objects in the lists comprise each global or initialized automatic variable of a union type that has at least one element of any of the predetermined data types.

12. The method of claim 8 wherein determining whether the referenced object satisfies a required data type comprises:
    searching the object list associated with the required data type for an object reference matching the reference passed to the function;
    determining that the referenced object satisfies the required data type if the matching object reference is found in the object list; and
    determining that the referenced object does not satisfy the required data type if the matching object reference is not found in the object list.

13. A computer-readable storage medium including data that, when accessed by a machine, cause the machine to perform a method comprising:
    parsing debug information generated by a compiler for a software program; identifying, in the debug information, one or more desired data types and objects associated with the desired data types;
    creating, for each desired data type, an object list including references to associated objects; and
    adding resulting object lists to a set of object files generated by the compiler for the software program, the set of object files with the added object lists to be used by a linker when creating an executable file for the software program,
    wherein the added object lists are utilized at runtime to determine whether a reference to an object passed to a function satisfies a data type requirement.

14. The computer-readable storage medium of claim 13 wherein the objects identified in the debug information comprise at least one of each global or initialized automatic variable of any of the desired data types, each global or initialized automatic variable of a data structure type that has at least one element of any of the desired data types, or each global or initialized automatic variable of a union type that has at least one element of any of the desired data types.

15. The computer-readable storage medium of claim 13 wherein utilizing the added object lists comprises:
   determining that a data type check is enabled;
   searching at least one added list corresponding to the data type requirement for an object reference matching the reference passed to the function;
   determining that the reference to the object satisfies the data type requirement if the matching object reference is found in the at least one added list; and
   returning an error if the matching object reference is not found in the at least one added list.

16. A computer-implemented system comprising:
   a memory; and
   a processing device, coupled to the memory, the processing device to cause:
   a parser to parse debug information generated by a compiler for a software program, and to identify, in the debug information, one or more desired data types and objects associated with the desired data types;
   a list creator, coupled to the parser, to create for each desired data type an object list including references to associated objects, and to add resulting object lists to a set of object files generated by the compiler for the software program, the set of object files with the added object lists to be used by a linker when creating an executable file for the software program; and
   an object type verifier to utilize the added object lists at runtime to determine whether a reference to an object passed to a function satisfies a data type requirement.

17. The system of claim 16 wherein the object type verifier utilizes the added object lists by
   determining that a data type check is enabled;
   searching at least one added list corresponding to the data type requirement for an object reference matching the reference passed to the function;
   determining that the reference to the object satisfies the data type requirement if the matching object reference is found in the at least one added list; and
   returning an error if the matching object reference is not found in the at least one added list.

18. The system of claim 16 wherein:
   the debug information has a DWARF format; and
   the set of object files and the executable file have an ELF or ECOFF format.

* * * * *